(12) United States Patent
Wu

(10) Patent No.: US 9,071,981 B2
(45) Date of Patent: Jun. 30, 2015

(54) METHOD OF MONITORING SEARCH SPACE OF ENHANCED DOWNLINK CONTROL CHANNEL IN ORTHOGONAL FREQUENCY-DIVISION MULTIPLE ACCESS SYSTEM

(71) Applicant: HTC Corporation, Taoyuan County (TW)

(72) Inventor: Chih-Yao Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 132 days.

(21) Appl. No.: 14/029,828

(22) Filed: Sep. 18, 2013

(65) Prior Publication Data

US 2014/0086063 A1 Mar. 27, 2014

Related U.S. Application Data

(60) Provisional application No. 61/703,791, filed on Sep. 21, 2012.

(51) Int. Cl.
*H04W 24/00* (2009.01)
*H04W 72/04* (2009.01)
*H04L 5/00* (2006.01)
*H04W 48/16* (2009.01)

(52) U.S. Cl.
CPC ............ *H04W 24/00* (2013.01); *H04W 72/042* (2013.01); *H04L 5/0053* (2013.01); *H04W 48/16* (2013.01)

(58) Field of Classification Search
None
See application file for complete search history.

(56) References Cited

U.S. PATENT DOCUMENTS

| 2002/0181603 | A1* | 12/2002 | Kim et al. | 375/265 |
| 2009/0207781 | A1* | 8/2009 | Sidi et al. | 370/328 |
| 2009/0259909 | A1* | 10/2009 | Luo | 714/748 |
| 2013/0102320 | A1* | 4/2013 | Suzuki et al. | 455/452.1 |
| 2014/0050187 | A1* | 2/2014 | Nakshima et al. | 370/329 |

OTHER PUBLICATIONS

3GPP TS 36.212, V10.6.0 "3rd Generation Partnership Project; Technical Specification Group Radio Access Network; Evolved Universal Terrestrial Radio Access (E-UTRA); Multiplexing and channel coding (Release 10)", 2012/06.

* cited by examiner

*Primary Examiner* — John Blanton
(74) *Attorney, Agent, or Firm* — Winston Hsu; Scott Margo

(57) ABSTRACT

A method of monitoring search space of enhanced downlink control channel (EPDCCH) for a user equipment in an orthogonal frequency-division multiple access (OFDMA) system includes determining whether to blind decode a monitoring downlink control information (DCI) candidate in a search space of a EPDCCH according to a code rate of the monitoring DCI decoding candidate, wherein the search space is determined according to a fixed threshold associated to a number of available resource element in a physical resource block pair for the EPDCCH.

7 Claims, 4 Drawing Sheets

METHOD OF MONITORING SEARCH SPACE OF ENHANCED DOWNLINK CONTROL CHANNEL IN ORTHOGONAL FREQUENCY-DIVISION MULTIPLE ACCESS SYSTEM

CROSS REFERENCE TO RELATED APPLICATIONS

This application claims the benefit of U.S. Provisional Application No. 61/703,791, filed on Sep. 21, 2012 and entitled "Method and Apparatus for Threshold Determination of Monitoring Search Space of Enhanced Downlink Control Channel for OFDMA Systems", the contents of which are incorporated herein in their entirety.

BACKGROUND OF THE INVENTION

1. Field of the Invention

The application relates to a method used in a communication device in a wireless communication system, and more particularly, to a method of monitoring search space of enhanced downlink control channel in orthogonal frequency-division multiple access system.

2. Description of the Prior Art

Physical downlink control channel (PDCCH) is necessary for 3rd Generation Partnership Project (3GPP) long term evolution (LTE) release 8-10 system to maintain communication via control information. The PDCCH in a LTE system carries user equipment (UE) specific scheduling assignments for Downlink (DL) resource allocation, Uplink (UL) grants, Physical Random Access Channel (PRACH) responses, UL power control commands, and common scheduling assignments for signaling messages (such as system information, paging, etc.). PDCCH is built based on Orthogonal Frequency-Division Multiple Access (OFDMA) system.

As technology advances, PDCCH is no longer suitable for further complicated network deployments and transmission schemes such as heterogeneous network and coordinated multipoint transmission/reception (CoMP) for its inability of frequency domain inter-cell interference cancellation (FDM-ICIC) and lack of finer granularity and also lack of enough control channel capacity. As a result, an enhanced physical downlink control channel (EPDCCH) is proposed to provide a more flexible and robust control channel under the various scenarios for 3GPP release 11.

It is agreed in 3GPP standard that a minimum aggregation level monitored by a UE could consist of much more or less resource elements (REs) compared to the legacy PDCCH where a minimum aggregation level monitored by the UE consists of fixed 36 REs equivalent to one control channel element (CCE). Wherein, RE is a minimum resource unit in LTE, indicated by one OFDM symbol in time domain and one subcarrier in frequency domain.

Moreover, it is agreed in 3GPP standard that one physical resource block (PRB) pair has a fixed number of enhanced CCEs (ECCEs) for the EPDCCH. The fixed number of ECCEs in a PRB pair can be 2 or 4 depending on a cyclic prefix (CP) length and the type of subframe. Available REs for EPDCCH transmission in one ECCE can vary a lot in different cases depending on a presence of other signals like cell-specific reference signals (CRS) and legacy PDCCH.

On the other hand, the legacy PDCCH aggregation levels monitored by a UE are 1, 2, 4 and 8 CCEs. Unlike PDCCH, there are two different types of EPDCCH: distributed type and localized type. The distributed type EPDCCH aggregation levels monitored by the UE can be 1, 2, 4, 8 and 16 ECCEs. Furthermore, the distributed type EPDCCH aggregation levels monitored by the UE will be 2, 4, 8, 16 and 32 ECCEs if a number of available REs in a PRB pair is below a certain threshold X, e.g. X=104. For localized type EPDCCH, in which aggregation levels monitored by the UE will be 1, 2, 4 and 8 ECCEs or 2, 4, 8 and 16 ECCEs similarly depending on the threshold X. Specifically, if the number of available REs in a PRB pair is smaller than the threshold X, the monitoring aggregation levels should have twice value (e.g. {2, 4, 8, 16} aggregation levels) than the other cases where the number of available REs in a physical resource block (PRB) pair is larger than the threshold value (e.g. {1, 2, 4, 8} aggregation levels).

However, the applicant notices that a problem arises if the threshold X is fixed (e.g. 104). More specifically, if the threshold X is set too large, a resource waste problem may occur. Otherwise, a reliability of the EPDCCH could be affected. Besides, if the threshold X is fixed, it is likely that some large DCI (e.g. DCI with format 2 or DCI with format 2C) will suffer from not only worse performance, and even become "non-decodable" if a code rate of the large DCI is greater than 1. Specifically, assuming there are 4 ECCEs and 104 available REs in one PRB pair. Then, one ECCE includes 26 REs in average and contains 52 encoded bits (assuming QKSP is used). However, the DCI with format 2C requires 58 bits in general and at least 29 REs should be allocated in one PRB, therefore, the code rate of the DCI with format 2C is 58/52>=1. Namely, part of information of the DCI with format 2C could be truncated after encoding and the DCI with format 2C becomes non-decodable.

Since the UE usually performs blind decoding on all monitoring DCI decoding candidates in the search space of the EPDCCH no matter the monitoring DCI candidate is decodable or non-decodable, in such situation, it is undesirable to have the UE monitoring a non-decodable DCI, which not only increases a blocking rate due to waste of DCI decoding candidates but also wastes power.

SUMMARY OF THE INVENTION

The application discloses a method of monitoring search space of enhanced downlink control channel in orthogonal frequency-division multiple access system, to solve the abovementioned problems.

The application discloses a method of monitoring search space of enhanced downlink control channel (EPDCCH) for a user equipment in an orthogonal frequency-division multiple access (OFDMA) system. The method includes determining whether to blind decode a monitoring downlink control information (DCI) decoding candidate in a search space for an EPDCCH according to a code rate of the monitoring DCI decoding candidate, wherein the search space is determined according to a fixed threshold associated to the number of available resource elements in a physical resource block pair for the EPDCCH.

The application further discloses a method of monitoring search space of enhanced downlink control channel (EPDCCH) for a user equipment in an orthogonal frequency-division multiple access (OFDMA) system. The method includes determining a threshold for valid resource elements (REs) in a physical resource block (PRB) pair for an EPDCCH according to a transmission mode, a carrier bandwidth configured for the user equipment in the OFDMA system, and sizes corresponding to a plurality of monitoring downlink control information (DCI) decoding candidates for the EPDCCH, selecting a search space and an aggregation level set for the plurality of monitoring DCI decoding candidates based on the determined threshold, and decoding each of the plurality of monitoring DCI decoding candidates for the EPDCCH according to the selected search space and the selected aggregation level set.

The application further discloses a method of monitoring search space of enhanced downlink control channel (EPDCCH) for a network in an orthogonal frequency-division multiple access (OFDMA) system. The method includes determining a threshold for available resource elements (REs) in a physical resource block (PRB) pair for an EPDCCH according to a transmission mode and a carrier bandwidth configured for the user equipment in the OFDMA system and sizes corresponding to a plurality of monitoring downlink control information (DCI) candidates, and selecting a search space and an aggregation level set for the plurality of DCI decoding candidates based on the determined threshold, and allocating an EPDCCH according to the selected search space and the selected aggregation level set.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
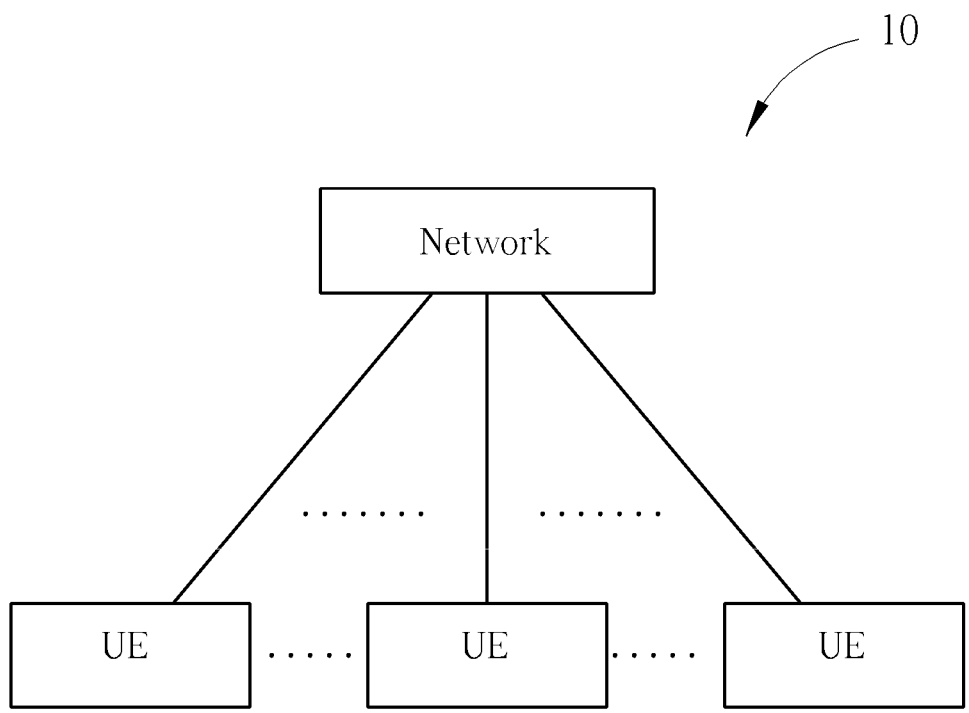
FIG. 1 is a schematic diagram of a wireless communication system.

Please refer to FIG. 1, which is a schematic diagram of a wireless communication system 10. The wireless communication system 10 is a Long-Term Evolution advanced (LTE-Advanced) system or other mobile communication systems utilizing an orthogonal frequency-division multiple access (OFDMA) modulation scheme, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UE can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
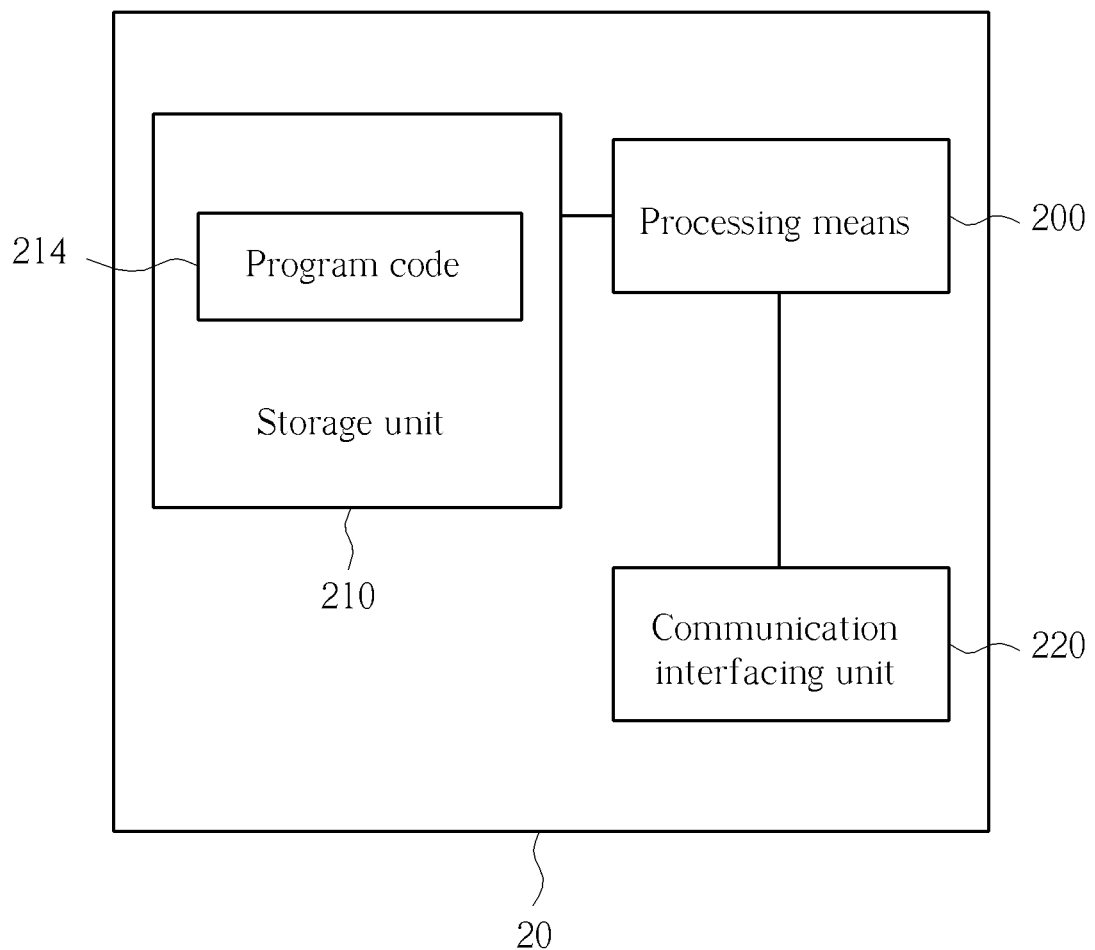
FIG. 2 is a schematic diagram of an exemplary communication device.

FIG. 2 illustrates a schematic diagram of an exemplary communication device 20. The communication device 20 can be the UE or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
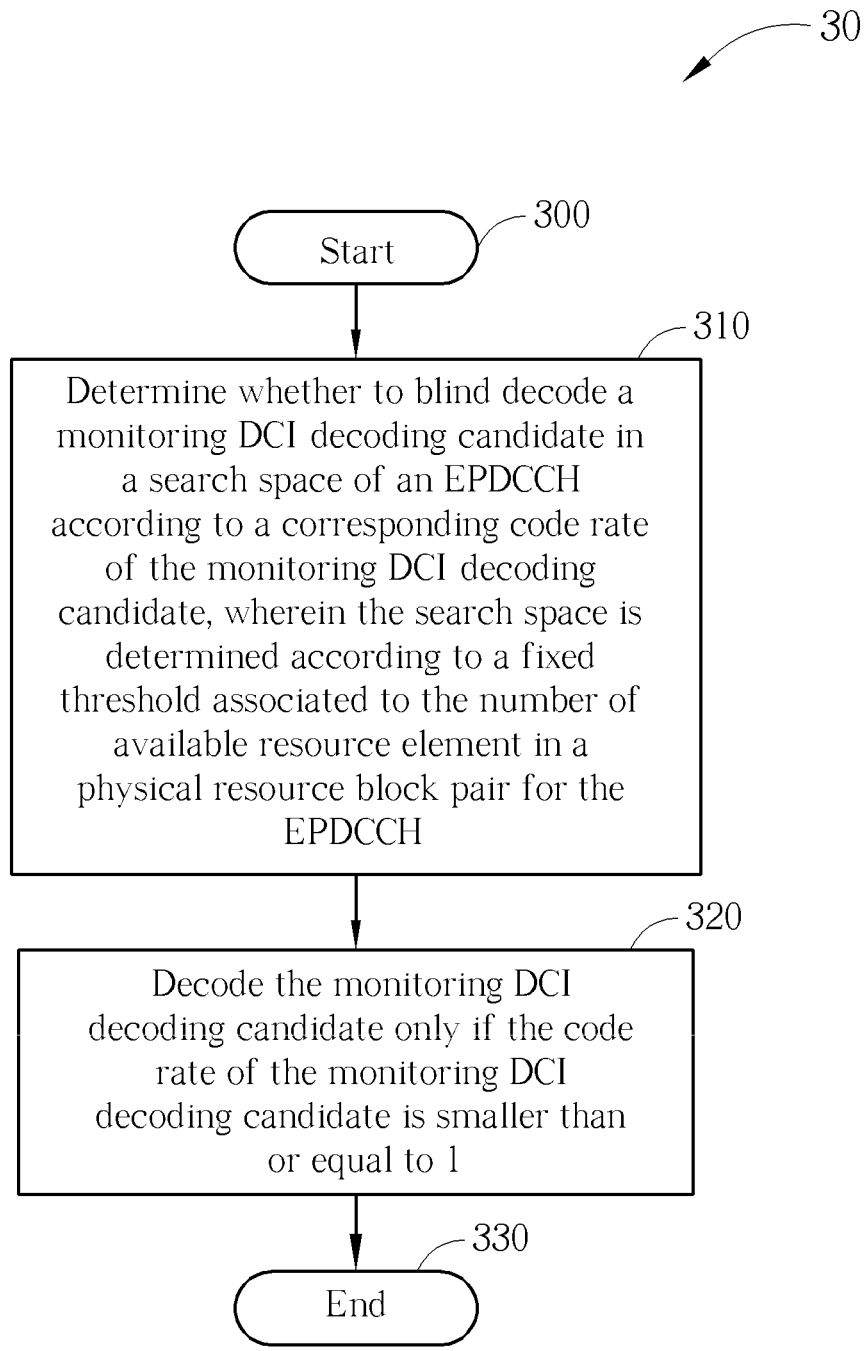
FIG. 3 is a flowchart of an exemplary process according to an embodiment of the application.

Please refer to FIG. 3, which illustrates a flowchart of an exemplary process 30. The process 30 is utilized in the communication device 20 or the UE shown in FIG. 1 for determining whether to perform blind decoding to a monitoring downlink control information (DCI) decoding candidate in a search space of the EPDCCH. The process 30 can be compiled into the program code 214 and includes the following steps:

Step 300: Start.

Step 310: Determine whether to blind decode a monitoring DCI decoding candidate in a search space of an EPDCCH according to a corresponding code rate of the monitoring DCI decoding candidate, wherein the search space is determined according to a fixed threshold associated to the number of available resource element in a physical resource block pair for the EPDCCH.

Step 320: Decode the monitoring DCI decoding candidate only if the code rate of the monitoring DCI decoding candidate is smaller than or equal to 1.

Step 330: End.

According to process 30, the UE determines whether to decode the monitoring DCI decoding candidate according to the code rate of the monitoring DCI decoding candidate. The UE decodes the monitoring DCI decoding candidate only if the code rate of the monitoring DCI is smaller than or equal to 1. Otherwise, the UE does not decode the monitoring DCI decoding candidate, to avoid wasting power on decoding non-decodable monitoring DCI decoding candidates.

For example, the code rate is regarded as a ratio of original/useful data and encoded/redundant data. If the code rate of the monitoring DCI decoding candidate is larger than 1, which means the original/useful data is larger than the encoded/redundant data, and thus the monitoring DCI is non-decodable since the UE is not possible to correctly decode the monitoring DCI decoding candidate with the code rate larger than 1.

Note that, the monitoring DCI decoding candidate is encoded based on the fixed threshold (e.g. threshold X=104) associated to the number of available REs in the PRB pair for the EPDCCH. As mentioned in the prior art, some large DCI (e.g. DCI with format 2 or DCI with format 2C) may become non-decodable due to the fixed threshold. And the UE performs blind decoding on all monitoring DCI decoding candidates in the search space of the EPDCCH no matter the monitoring DCI decoding candidate is decodable or non-decodable.

With the process 30, the UE does not perform blind decoding on all of the monitoring DCI decoding candidates, but decodes the monitoring DCI decoding candidate based on the corresponding code rate, so as to exclude non-decodable blind decoding candidates. Thus, efficiency for the UE to decode the monitoring DCI decoding candidate is improved and power of the UE is saved.

Please note that using code rate 1 as a threshold to determine whether a DCI decoding candidate is decodable or not is used in example but not limits the embodiment of the present invention. Other predetermined code rates, e.g. 0.95, 0.9 and 0.85, can be used as the threshold to determine whether a DCI decoding candidate is decodable or not.

Figure 4:
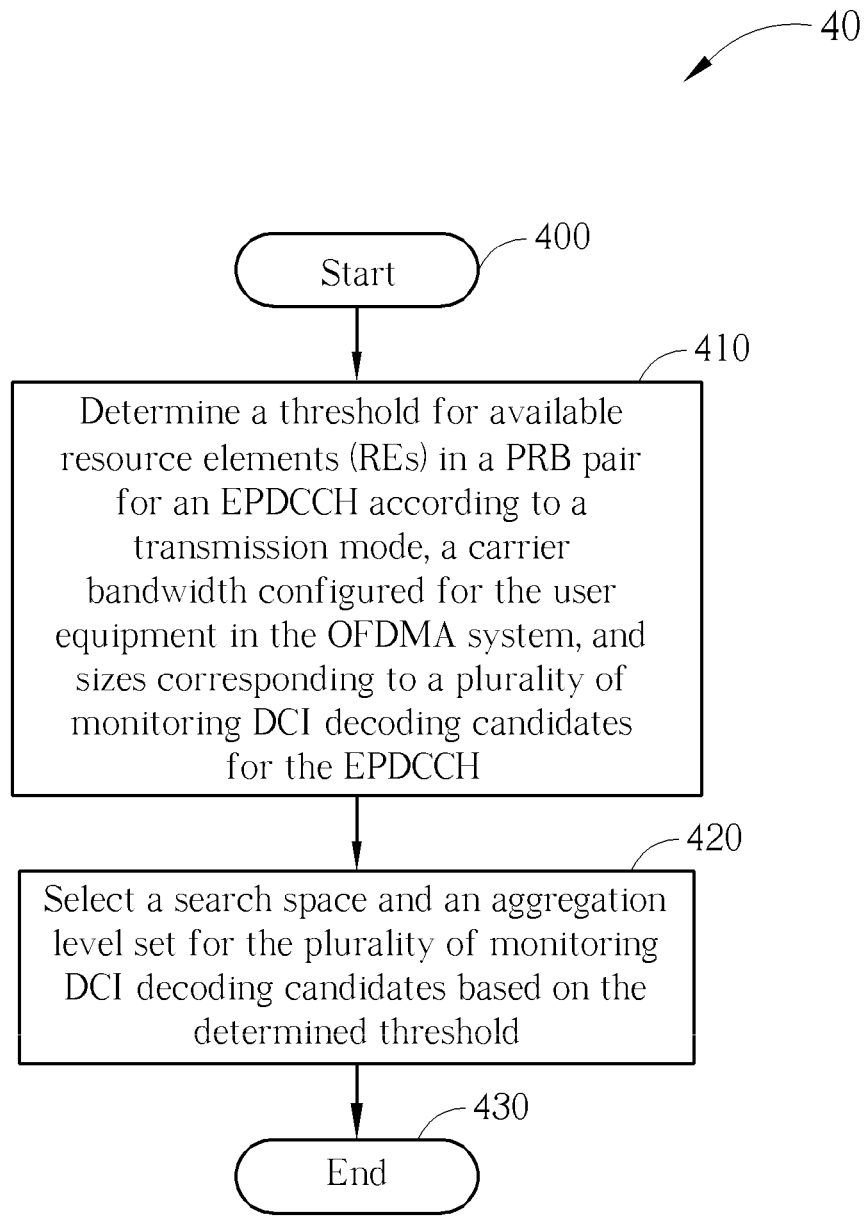
FIG. 4 is a flowchart of an exemplary process according to another embodiment of the application.

Please refer to FIG. 4, which illustrates a flowchart of an exemplary process 40. The process 40 is utilized in the communication device 20 or the network shown in FIG. 1 for determining a threshold of a search space of the EPDCCH.

The process 40 can be compiled into the program code 214 and includes the following steps:

Step 400: Start.

Step 410: Determine a threshold for available resource elements (REs) in a PRB pair for an EPDCCH according to a transmission mode, a carrier bandwidth configured for the user equipment in the OFDMA system, and sizes corresponding to a plurality of monitoring DCI decoding candidates for the EPDCCH.

Step 420: Select a search space and an aggregation level set for the plurality of monitoring DCI decoding candidates based on the determined threshold.

Step 430: End.

According to process 40, both of the UE and the network determine the threshold for the search space of the EPDCCH according to the transmission mode, the carrier bandwidth configured for the UE, and sizes corresponding to the plurality of monitoring DCI decoding candidates in the search space. In such a circumstance, the threshold is set to ensure all of the monitoring DCI decoding candidates in the search space are expected to be decodable.

In detail, both of the UE and the network first identify the transmission mode and the carrier bandwidth configured for the UE. Therefore, the UE and the network have a same understanding on the sizes of monitoring DCI decoding candidates. Then, the threshold X is set to a certain value to ensure each monitoring DCI decoding candidate in the search space is expected to be decodable.

In other words, the UE and the network shall make sure a worst case that a monitoring DCI decoding candidate which has a smallest aggregation level and a largest DCI size (largest number of bits in payload) is expected to be decodable (e.g., code rate $\leq 1$). After that, the UE and the network may choose a proper monitoring search space and an aggregation level set (e.g. aggregation level set=$\{1, 2, 4, 8\}$ or $\{2, 4, 8, 16\}$) based on the chosen threshold X. After, for the UE side, the UE is able to decode each of the plurality of monitoring DCI decoding candidates for the EPDCCH according to the selected search space and the selected aggregation level set; and for the network side, the network is able to allocate an EPDCCH according to the selected search space and the selected aggregation level set.

Note that, the UE and the network shall dynamically choose the threshold X when at least one of the transmission mode, carrier bandwidth and other configurations affecting the DCI size is changed. Both of the UE and the network may compute a new threshold X' for the search space based on a new transmission mode and/or a new carrier bandwidth. As a result, every monitoring DCI decoding candidate may be expected to be decodable with the process 40.

An example is as follows. If a LTE-capable UE is configured in a transmission mode 9 and a carrier bandwidth is 10 MHz, and the UE monitors both DCI with format 1A (42 bits) and DCI with format 2C (58 bits) candidates.

Regarding a monitoring DCI decoding candidate is considered to be non-decodable when the code rate is larger than 1, a minimum number of REs used by a minimum aggregation level of the search space shall not smaller than 58/2=29 (quadrature phase-shift keying (QPSK) modulation is assumed), so as to ensure the monitoring DCI decoding candidate is decodable. Therefore, assuming there are 4 ECCEs in a PRB pair, the threshold X should be equal to 29*4=116.

Note that, the UE and the network shall determine the threshold according to a maximum size among the sizes corresponding to the plurality of monitoring DCI decoding candidates, such that each of the plurality of DCI decoding candidates is decodable. Based on the example abovementioned, the UE and the network determine the threshold according to the size of the DCI with format 2C (58 bits).

Please note that the UE and the network determining the threshold according to a maximum size among the sizes corresponding to the plurality of monitoring DCI decoding candidates is used in example but not limits the embodiment of the present invention. Another example is to select different thresholds for each DCI size, thus leads to different search spaces for each DCI size.

Please note that using code rate 1 as a threshold to determine whether a DCI decoding candidate is decodable or not is used in example but not limits the embodiment of the present invention. Other code rates (e.g. 0.95, 0.9 and 0.85) can be used as the threshold to determine whether a DCI decoding candidate is decodable or not.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 20.

In conclusion, various methods of monitoring search space of EPDCCH are provided, so that the efficiency for blind decoding performed by the UE may be improved and power of the UE may be saved by excluding non-decodable DCI decoding candidates despite the fixed threshold. In addition, the UE and the network may dynamically choose the threshold based on the transmission mode and carrier bandwidth configured for the UE and sizes of the monitoring DCI decoding candidates, so that every monitoring DCI decoding candidates may be expected to be decodable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of monitoring search space of enhanced downlink control channel (EPDCCH) for a user equipment in an orthogonal frequency-division multiple access (OFDMA) system, comprising:

determining whether to blind decode a monitoring downlink control information (DCI) decoding candidate in a search space for an EPDCCH according to a code rate of the monitoring DCI decoding candidate, wherein the search space is determined according to a fixed threshold associated to the number of available resource elements in a physical resource block pair for the EPDCCH.

2. The method of claim 1, wherein determining whether to blind decode the DCI decoding candidate in the search space for the EPDCCH according to the code rate of the monitoring DCI decoding candidate comprises decoding the monitoring DCI decoding candidate only if the code rate of the monitoring DCI decoding candidate is regarded as decodable.

3. The method of claim 2, wherein the code rate of the monitoring DCI decoding candidate is regarded as decodable only if the code rate of the monitoring DCI decoding candidate is smaller or equal to a predetermined value (e.g. 1, 0.95, 0.9 and 0.85).

4. A method of monitoring search space of enhanced downlink control channel (EPDCCH) for a user equipment in an orthogonal frequency-division multiple access (OFDMA) system, comprising:
- determining a threshold for valid resource elements (REs) in a physical resource block (PRB) pair for an EPDCCH according to a transmission mode, a carrier bandwidth configured for the user equipment in the OFDMA system, and sizes corresponding to a plurality of monitoring downlink control information (DCI) decoding candidates for the EPDCCH;
- selecting a search space and an aggregation level set for the plurality of monitoring DCI decoding candidates based on the determined threshold; and
- decoding each of the plurality of monitoring DCI decoding candidates for the EPDCCH according to the selected search space and the selected aggregation level set.

5. The method of claim 4, wherein determining the threshold for valid REs in the physical resource block (PRB) pair for the EPDCCH according to the transmission mode and the carrier bandwidth configured for the user equipment in the OFDMA system and sizes corresponding to the plurality of monitoring downlink control information (DCI) decoding candidates for the EPDCCH comprises:
- determining the threshold according to a maximum size among the sizes corresponding to the plurality of monitoring DCI decoding candidates, such that each of the plurality of DCI decoding candidates is decodable.

6. A method of monitoring search space of enhanced downlink control channel (EPDCCH) for a network in an orthogonal frequency-division multiple access (OFDMA) system, comprising:
- determining a threshold for available resource elements (REs) in a physical resource block (PRB) pair for an EPDCCH according to a transmission mode and a carrier bandwidth configured for the user equipment in the OFDMA system and sizes corresponding to a plurality of monitoring downlink control information (DCI) candidates; and
- selecting a search space and an aggregation level set for the plurality of DCI decoding candidates based on the determined threshold; and
- allocating an EPDCCH according to the selected search space and the selected aggregation level set.

7. The method of claim 6, wherein determining the threshold for available REs in the physical resource block (PRB) pair for the EPDCCH according to the transmission mode and the carrier bandwidth configured for the user equipment in the OFDMA system and sizes corresponding to the plurality of monitoring downlink control information (DCI) decoding candidates comprises:
- determining the threshold according to a maximum size among the sizes corresponding to the plurality of monitoring DCI decoding candidates, such that each of the plurality of DCI decoding candidates is decodable.

\* \* \* \* \*